United States Patent [19]

Smith et al.

[11] Patent Number: 4,573,253

[45] Date of Patent: Mar. 4, 1986

[54] OPTICAL FIBER CABLE FABRICATION TECHNIQUE

[75] Inventors: Warren F. Smith, Branford; Eugene Shapiro, Hamden; Joseph Winter, New Haven, all of Conn.

[73] Assignee: Olin Corporation, New Haven, Conn.

[21] Appl. No.: 626,509

[22] Filed: Jun. 29, 1984

[51] Int. Cl.⁴ .......................... B23P 19/04; G02B 6/44
[52] U.S. Cl. ..................................... 29/460; 350/96.23
[58] Field of Search ............... 29/460, 423; 350/96.23, 350/96.1, 96.24, 96.25

[56] References Cited

U.S. PATENT DOCUMENTS

| | | |
|---|---|---|
| 4,199,224 | 4/1980 | Oestreich . |
| 4,232,935 | 11/1980 | Rohner et al. . |
| 4,257,675 | 3/1981 | Nakagome et al. . |
| 4,341,440 | 7/1982 | Trezeguet et al. . |
| 4,367,917 | 1/1983 | Gray . |
| 4,372,792 | 2/1983 | Dey et al. ............. 350/96.23 |
| 4,396,446 | 8/1983 | Franken . |
| 4,446,686 | 5/1984 | Panuska et al. ............. 350/96.23 |

FOREIGN PATENT DOCUMENTS

| | | |
|---|---|---|
| 895094 | 5/1983 | Belgium . |
| 2507648 | 9/1976 | Fed. Rep. of Germany . |
| 2507649 | 9/1976 | Fed. Rep. of Germany . |
| 1583520 | 1/1981 | United Kingdom . |
| 1592191 | 7/1981 | United Kingdom . |
| 2091903A | 8/1982 | United Kingdom . |

*Primary Examiner*—Howard N. Goldberg
*Assistant Examiner*—Steven Nichols
*Attorney, Agent, or Firm*—Barry L. Kelmachter; Howard M. Cohn; Paul Weinstein

[57] ABSTRACT

A process and apparatus for fabricating an optical fiber cable assembly without significantly increasing the light attenuation in the optical fiber or fibers is described. An optical fiber assembly formed in accordance with the present invention comprises at least one optical fiber encapsulated within a metal or metal alloy tube. The tube is preferably formed using a draw forming technique of pulling a metal or metal alloy tape through at least one forming die. To compensate for the compressional strain induced in the fiber or fibers by tube springback upon relaxation of the pull force and to minimize increased light attenuation in the fiber or fiber, a back tension is imparted to each optical fiber during cable assembly. In a preferred embodiment, the back tension is imparted to each fiber by an accumulator about which the optical fiber is wound.

21 Claims, 6 Drawing Figures

OPTICAL FIBER CABLE FABRICATION TECHNIQUE

The present invention relates to a process and apparatus for fabricating optical fiber communication cables.

In recent years, there has been a great deal of activity in the field of information transmission using light waves. These developments have led to the advent of optical fiber transmission cables having glass fibers to guide light beams. Many of the original optical fiber cables were non-metallic optical fiber cable assemblies having no metallic structural layers. While such non-metallic optical fiber cable assemblies are suitable for transmitting data or other information, they suffer from a number of serious deficiencies. For example, they tend to have a low tensile strain and are extremely fragile. When subjected to some of the more extreme forces and stresses encountered during ordinary service, the cables also tend to break easily. Other problems include kinks which result in the occurrence of unacceptable attenuation increases in the glass fiber when short-range compressive forces are encountered.

To overcome these problems, it has been proposed to armor the optical fiber or fibers with a metallic tube. The tube's primary function is to protect the fragile fiber or fibers from the forces and stresses encountered during service. In some assemblies, the metallic tube also functions as an electrical conductor for transmitting power to repeaters, sensors and other electrical devices. A variety of techniques for forming these cable assemblies are known in the art. U.S. Pat. Nos. 4,119,224 to Oestrich, 4,232,935 to Rohner et al., 4,257,675 to Nakagome et al., 4,341,440 to Trezeguet et al., 4,367,917 to Gray, 4,372,792 to Dey et al., and 4,396,443 to Franken, U.K. Pat. Nos. 1,583,520 and 1,592,191, both to Chapman, U.K. Patent Application No. 2,091,903A to Sadler et al., German Offenlegungsschrift No. 2,507,648 to Tscharntke et al. and German Offenlegungsschrift No. 2,507,649 to Tscharntke illustrate some of the prior art cable fabrication techniques.

Recently, a draw forming technique for manufacturing tubular, armored optical fiber cables has been developed. In this technique, a metallic armor or containment tube is fabricated about one or more optical fibers by pulling a metal or metal alloy tape through at least one tube forming die and inserting one or more optical fibers into the forming tube. Co-pending U.S. patent application Ser. Nos. 395,443, filed July 6, 1982, to Pryor et al., now U.S. Pat. No. 4,477,147; and 497,639, filed May 24, 1983, to Winter et al. co-pending U.S. patent application Ser. No. 413,846, filed Sept. 1, 1982, now U.S. Pat. No. 4,508,423, to Winter et al.; allowed co-pending U.S. application Ser. No. 497,535, filed May 24, 1983 to Winter et al.; and co-pending U.S. patent application Serial Nos. 497,522, 497,533, and 497,546, all filed May 24, 1983, all to Winter et al.; 505,000, filed June 16, 1983 to Winter et al.; and co-pending U.S. Pat. application Ser. No. 618,271 filed June 7, 1984 to Winter et al. illustrate this technique and several variations thereon.

One of the requirements of this technique is the development of high draw stresses in the metal tubes on the exit side of the forming die or dies. These high draw stresses are a result of the forming energy being transmitted by a tensional pulling force. When this pulling force or draw force is relaxed after cable manufacture has been completed, the metal tube generally becomes shorter due to elastic springback. In some cable constructions formed by this technique, there is sufficient friction force between the glass fiber or its surrounding buffer material and the armor tube that springback of the tube transmits an undesirable compressional strain to the glass fiber or fibers. When this compressional strain is sufficiently large, light attenuation in the fiber or fibers may increase to a level where light transmission is significantly degraded. The magnitude of the degradation is related to the amount of compressional strain which, in turn, is related to the amount of tube springback. Where the optical fiber armor tube is formed from a high strength metal or metal alloy, a greater springback than normal generally occurs during cable manufacture.

The present invention substantially reduces the risk of significantly increasing attenuation in the fiber or fibers as a result of tube springback. This is accomplished by applying a back tension of predetermined magnitude to each optical fiber as it is fed into the tube forming apparatus. By carefully controlling the back tension force applied to each fiber, the back tensional strain on each fiber may be adjusted to substantially compensate for the compressional strain induced by tube springback. By using the present invention, the net strain on the each fiber after fabrication is approximately zero and substantially no increase in light attenuation is caused.

In some prior art fabrication techniques such as those illustrated by the Dey et al. and Chapman patents, there is some discussion of imparting restraint to each optical fiber as it is caused to travel along with the metal or metal alloy strip from which the tube is formed. While this restraint appears to impose a slight back tension on each fiber, it is believed that the capstan or pinch rollers used to impart the restraint are insufficient to provide a back tension level that avoids compressional strain damage in the fiber. This insufficiency is believed to be due to the limited contact surface between each fiber and its capstan or pinch rollers. There is also no recognition in these patents that a certain level of back tension is desirable to avoid light attenuation damage during cable fabrication and that this back tension level is related to the particular optical fiber material being encapsulated.

In accordance with the present invention, the risk of increasing fiber attenuation during cable fabrication is substantially reduced by applying to each fiber a back tension force in accordance with the following equation:

$$P_F = E_F \left[ \frac{P_T}{\frac{\pi}{4}(D_{OD}^2 - D_{ID}^2) E_A} \right] \cdot \left[ \frac{\pi}{4} D_F^2 \right]$$

where
  $P_T$ = the draw force in the tube;
  $E_F$ = the elastic modulus of the fiber being encapsulated;
  $D_{OD}$ = the tube outer diameter;
  $D_{ID}$ = the tube inner diameter;
  $E_A$ = the elastic modulus of the tube material;
and
  $D_F$ = the fiber diameter.

One of the advantages of the present invention is that optical fibers having different physical constructions may be encapsulated within a single armor tube using a draw forming technique.

In a preferred technique for forming an optical fiber cable assembly, a metal or metal alloy tape is payed off a reel and pulled through at least one die to form the armor tube. While the tape is being formed into the tube, at least one optical fiber is payed off a reel, wound about an accumulator and fed into the forming tube. The tension force required to pull the tape through each die is preferably provided by wrapping the optical fiber cable assembly about a driven capstan or bull block. After the cable assembly exits the capstan or bull block, it preferably passes through a station for sealing the tube seam. Thereafter, the cable assembly is finally wound upon a take-up reel.

In this technique, the accumulator is used to apply a desired back tension to the fiber or fibers. The number of fiber windings about the sheaves of the accumulator and the load applied to each sheave determine the back tension applied to each fiber. Where a plurality of fibers are to be encapsulated, a plurality of accumulators may be used to apply the same or different back tensions to the fibers.

It is an object of the present invention to provide an apparatus and process for fabricating an optical fiber cable that does not substantially increase fiber attenuation during cable manufacture.

It is a further object of the present invention to provide an apparatus and process as above that provides an optical fiber cable in which each optical fiber has a net strain of substantially zero after fabrication.

These and other objects and advantages will become more apparent from the following description and drawings wherein like reference numerals depict like components.

In accordance with the present invention, it is proposed to provide a technique for fabricating optical fiber cables which substantially reduces the risk of increasing fiber attenuation to unacceptable levels during cable fabrication. The technique of the present invention uses a draw forming technique to fabricate the armor or containment tube about the optical fiber or fibers. The foregoing goal is accomplished herein by applying to each optical fiber being armored, a back tension force that creates a back tensional strain in each fiber that substantially compensates for the compressional strain induced by armor tube springback after cable formation.

Referring now to FIGS. 1–4, a system 10 for fabricating an optical fiber cable core assembly 11 in accordance with the present invention is illustrated. In this system, a metal or metal alloy tape 12 from which the armor or containment tube 14 is formed is payed off a reel 13 and wound about an accumulator or dancer 16. The accumulator 16 permits accumulation of a length of tape 12 sufficient to assure a substantially constant tape delivery rate to all downstream apparatus. The accumulator 16 may comprise any conventional accumulator known in the art.

Figure 1:
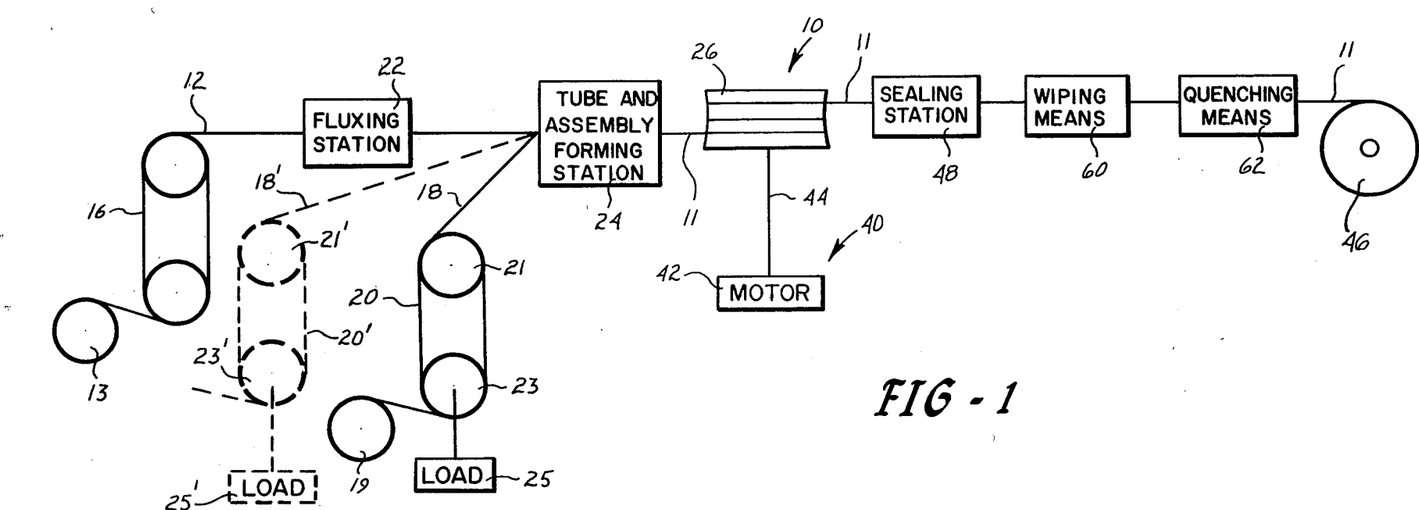
FIG. 1 is a schematic representation illustrating the optical fiber cable fabrication system of the present invention.

The tape 12 comprises a continuous strip of a metal or metal alloy possessing a desired set of physical properties. The desirability of various physical properties depends upon the application for the cable assembly. For example, where the armoring 14 is to function as an electrical conductor as well as a protective strength member, the tape material should possess high strength and high electrical conductivity. Where the armoring 14 is to be used primarily as a strength member, the tape material may be a very high strength, low conductivity material. For most applications, strength is the paramount consideration. Consequently, it is desirable for the tape material to have a relatively high yield strength. Other desirable properties include good resistance to softening upon short term exposure to elevated temperatures and the ability to sustain coiling forces during fabrication and installation.

Preferably, the tape material has a conductivity in the range of about 2% to about 102% IACS, a yield strength of at least about 30 ksi, most preferably at least about 50 ksi, a yield strain in the range of about 0.15% to about 1%, most preferably from about 0.3% to about 0.95% and a diameter-to-thickness ratio of about 3:1 to about 25:1, preferably from about 4:1 to about 20:1. As used herein, the term yield strain is the strain at the yield strength at 0.2% offset.

A wide range of ferrous and non-ferrous metallic materials possess these desired properties and may be used; however, it is preferred to use a copper base alloy for the tape material. Suitable copper base alloys include a high copper alloy containing zirconium produced by Olin Corporation and designated Copper Alloy 151 alloy C15500, alloy C19400, alloy C19500, alloy C63800 and alloy C68800.

The tape material may have any desired cross-sectional shape. For example, the tape 12 may have a rectangular cross-sectional shape. Where a tape having a rectangular cross-sectional shape is used, the tape width should be at least about equal to the outer circumference or periphery of the desired armoring construction. In a preferred approach, the tape material 12 has a trapezoidal cross-section. It has been discovered that a tape material having such a cross-sectional shape is subjected to reduced forces and stresses when pulled through one or more tube forming dies. For reasons to be discussed more fully hereinafter, it is also desirable to use a tape 12 having a transverse cross-sectional area which exceeds the desired transverse cross-sectional area of the armoring 14 by about 5% to about 20%, preferably by about 8% to about 17% and most preferably by about 10% to about 15%.

It is also desirable for the tape material to have sufficient hardness and/or ductility to enable it to be formed into a hollow tubular member by being drawn through one or more forming dies. Accordingly, the tape material should be in a wrought and partially work hardened condition. Preferably, the tape material is at least about ¼ hard and most preferably at least about full hard.

As described more fully hereinafter, the tape 12 is formed into the armoring tube 14 by pulling or drawing the tape through at least one tube forming die. In this type of tube forming approach, high draw stresses develop in the metallic tube on the tube side or exit side of the forming die or dies as a result of the forming energy being transmitted by a tensional pulling force. When this pulling force is released or relaxed, the tube 14 generally becomes shorter due to elastic springback. In general, the greater the strength of the metallic tube material, the greater the springback. Where a frictional relationship exists between the armor tube and the optical fiber or fibers encapsulated therein, springback of the armor tube often transmits a permanent compressional strain to the optical fiber(s). The degree of compressional strain imparted to each optical fiber is a function of the amount of springback. In some instances, the compressional strain imparted to each fiber may increase fiber attenuation to unacceptable levels that interfere with light transmission.

By the present invention, the risk of transmitting a permanent compressional strain to the fiber(s) that increases fiber attentuation to unacceptable levels is significantly reduced and substantially eliminated. This is accomplished by applying to each optical fiber a predetermined back tension force that induces in each fiber a back tensional strain that substantially compensates for springback-induced compressional strain.

The back tension force needed to compensate for springback induced compressional strain may be determined in the following manner. The draw stresses $\sigma_T$ exerted on the forming tube are a function of the applied tube forming draw force $P_T$, the tube outside diameter $D_{OD}$, and the tube inside diameter $D_{ID}$. The relationship between these parameters may be expressed as follows:

$$\sigma_T = \frac{P_T}{\frac{\pi}{4}(D^2_{OD} - D^2_{ID})} \quad (1)$$

The elastic tension strain $\epsilon_T$ of the tube on the exit side of the tube forming die is a function of the draw stress $\sigma_T$ and the elastic modulus $E_A$ of the tube material. The relationship is as follows:

$$\epsilon_T = \sigma_T/E_A \quad (2)$$

Substituting equation (1) into equation (2), it is found that:

$$\epsilon_T = \frac{P_T}{\frac{\pi}{4}(D^2_{OD} - D^2_{ID})E_A} \quad (3)$$

To obtain a substantially zero residual stress in a fiber after cable fabrication, the back tension strain $\epsilon_F$ on the fiber as it enters the forming die or dies should equal the elastic tension strain $\epsilon_T$ on the tube at the exit side of the forming die or dies. Therefore, $\epsilon_F = \epsilon_T$ or $$\epsilon_F = \frac{P_T}{\frac{\pi}{4}(D^2_{OD} - D^2_{ID})E_A} \quad (4)$$

The back tension force $P_F$ that should be applied to each optical fiber as it enters the forming die is a function of the fiber stress $\sigma_F$ and the fiber cross-sectional area. The relationship between these parameters may be expressed as:

$$P_F = \sigma_F \left(\frac{\pi}{4}\right) D_F^2 \quad (5)$$

where $D_F$ = the fiber diameter.

The stress on the fiber may also be expressed as:
$$\sigma_F = \epsilon_F E_F \quad (6)$$

where $E_F$ = the elastic modulus of the optical fiber.

Substituting equations (4) and (6) into equation (5), the following relationship may be obtained:

$$P_F = E_F \left[\frac{P_T}{\frac{\pi}{4}(D^2_{OD} - D^2_{ID})E_A}\right] \left(\frac{\pi}{4}\right) D_F^2 \quad (7)$$

From this relationship, the back tension force that needs to be applied to each fiber can be determined for a known applied draw force. While it is preferred to apply to each fiber the back tension magnitude defined by equation (7), it has been found that satisfactory results can also be achieved using a back tension have a magnitude within ±20%, preferably within ±5%, of the back tension magnitude defined by equation (7).

In a preferred embodiment of the present invention, the back tension force is applied to each optical fiber by an accumulator 20 about which it is wound. The optical fiber or fibers 18 or 18' to be inserted into the armor tube 14 may comprise any commercially available buffered optical fiber. Generally, such an optical fiber consists of optical grade glass having an approximate diameter of about 0.001" coated by one or more layers of a buffered material such as nylon, polyvinyl formal, fluoroethylenepropylene copolymers, polyetylene, other acrylic materials and a coating sold under the trademark HYTREL by duPont. While any suitable optical fiber known in the art may be used, it is preferred to use an optical fiber capable of withstanding exposure to temperatures as high as 260° C. for about 1 second in a limited atmosphere without seriously degrading. While it is preferred to encapsulate a buffered optical fiber or fibers, the present technique also extends to the encapsulation of non-buffered optical fibers and optical fibers having a ceramic or other organic barrier layer.

Each optical fiber 18, 18' is payed off a reel 19 and wound or wrapped about the reels or sheaves 21 and 23 of an accumulator 20 or 20'. From the accumulator 20, the fiber 18 is fed into a tube forming and cable assembling station 24. A pull force is applied to the fiber 18, 18' in a manner described more fully hereinafter to pull the fiber or fibers through the station 24.

The back tension applied to the fiber 18, 18' by its accumulator 20, 20' is a function of the number of fiber turns about the sheaves 21, 21', 23, and 23', and the load 25, 25' applied to the sheave 21, 21' and/or the sheave 23, 23'. In a preferred embodiment, a load necessary to achieve the desired back tension magnitude is applied to the sheave 23, 23'. Any suitable means (not shown) known in the art may be used to apply the load to the sheave 23, 23'. For example, a small weight may be suspended from the sheave. The accumulator 20 and/or 20' may comprise any conventional accumulator known in the art.

As well as imparting back tension to the fiber 18, 18', the accumulator 20, 20' has several other purposes.

First, it assures that there is sufficient slack in the optical fiber to avoid the formation of kinks or snags that may seriously damage the optical fiber. Second, it assures that there is a sufficient supply of optical fiber to travel along with the tape 12 and the cable assembly 11 as it is formed.

While FIG. 1 primarily illustrates a single optical fiber 18 being fed into the tube forming and cable assembly 24, more than one optical fiber may be encapsulated within a single tube 14. The fibers may be inserted separately or as a preformed composite e.g. a rope of optical fibers. When multiple individual fibers are to be encapsulated, each fiber 18 or 18' is fed off its own reel 19 and wound about its own accumulator 20 or 20'. By winding each fiber about a separate accumulator, it is possible to apply different back tensions to the fibers. Different back tensions may be needed if optical fibers formed from different materials are to be encapsulated within a single tube.

To form the cable assembly 11, the metallic tape 12 is first drawn or pulled through a fluxing station 22. The fluxing station 22 may comprise any suitable flux applying apparatus known in the art. The fluxing station 22 applies a small amount of flux lubricant preferably to that tape surface which contacts the tube forming apparatus and forms the outer periphery of the tube 14. The flux lubricant primarily minimizes the friction created during the tube forming operation. In addition, it protects the surface forming the outer periphery of the tube 14 so that its solderability is not diminished. While any suitable flux lubricant known in the art may be used, it is preferred to use a flux lubricant that is water soluble so that it can be easily removed later on.

After passing through the fluxing station 22, the tape 12 is pulled through the tube forming and cable assembling station 24. At the same time that the tape 12 is being fed into the station 24, the fiber or fibers 18 to be encapsulated are pulled into the station 24. The fiber or fibers 18 enter the station 24 in a manner such that the tube 14 is formed about the incoming fiber or fibers 18. The force for pulling or drawing the tape 12 and the fiber or fibers 18 through the station 24 is preferably provided by a tensioning device 26. The manner in which the tensioning device 26 provides this force will be discussed more fully hereinafter.

Figure 2:
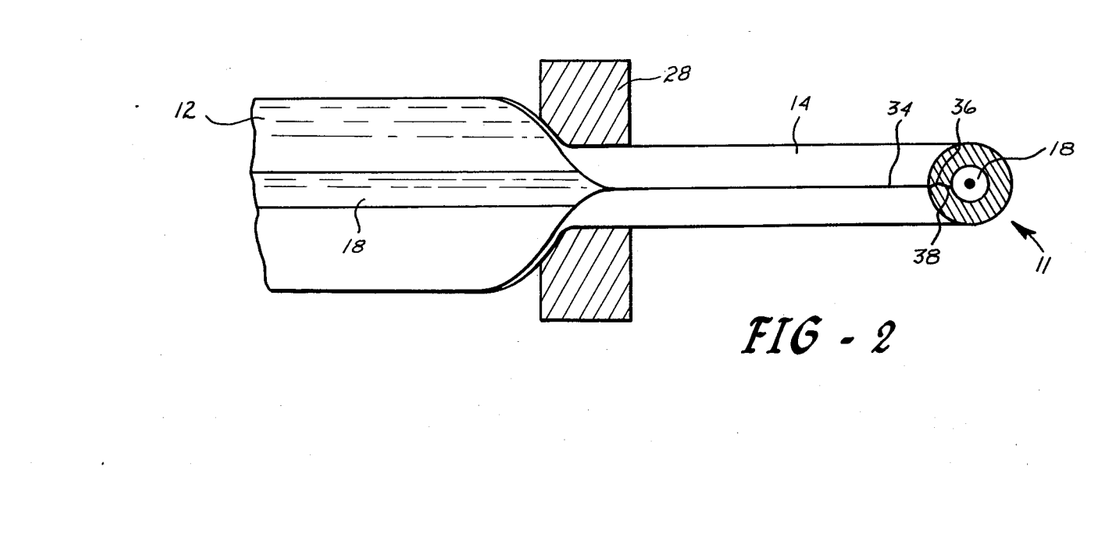
FIG. 2 is a cross-sectional view of a first embodiment of a tube forming apparatus to be used in the system of FIG. 1.
Figures 3, 4:
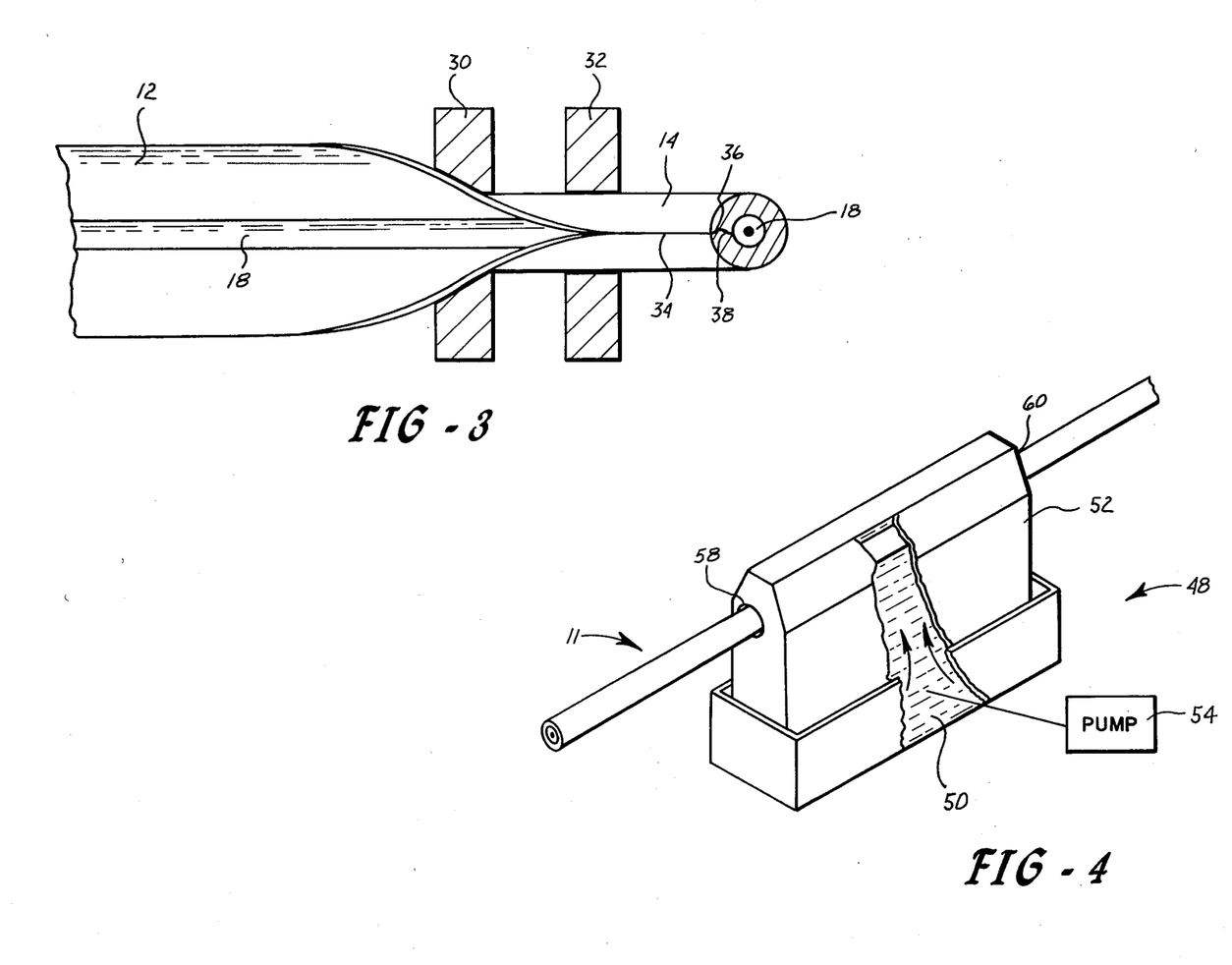
FIG. 3 is a cross-sectional view of an alternative tube forming apparatus embodiment to be used in the system of FIG. 1.
FIG. 4 is a view in partial cross-section of the tube sealing apparatus.
Figure 5:
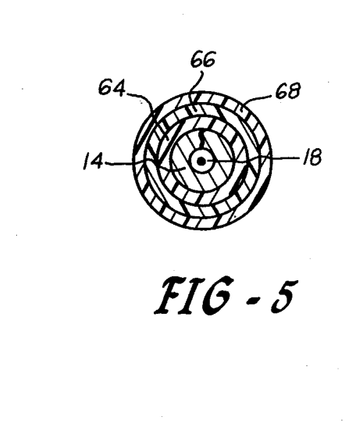
FIG. 5 is a cross-sectional view of an optical fiber cable assembly formed in accordance with the present invention.

Referring now to FIG. 2, while the tube forming and cable assembling station 24 may comprise any suitable tube forming apparatus known in the art, it is preferred to form the tape 12 into the tube 14 using a single tube forming die 28. The die 28 may comprise any suitable die known in the art as long as it is capable of forming the tape 12 into a tube 14 circumferentially encapsulating the fiber or fibers 18. The die has a substantially circular bore sized to form a tube with a desired outer diameter. Using this one die approach, a tube 14 having a generally longitudinally extending seam 34 that is in a somewhat relaxed condition is formed.

Where it is desired to form a tube 14 having a seam 34 that is in a state of compression, the one die station of FIG. 2 may be replaced by the two die station of FIG. 3. In the embodiment of FIG. 3, the tape 12 is passed through two forming dies 30 and 32. As the tape 12 passes through the die 30, it is formed into an open tube section in whose center the fiber or fibers 18 are positioned. As this assembly passes through the second die 32, the open tube section is closed about the fiber or fibers 18 and the seam 34 is placed into compression. While dies 30 and 32 may comprise any suitable dies known in the art, it is preferred to use a die having a substantially circular bore with a relief notch for the die 30 and a bending-expansion die 32. In both tube forming station embodiments, the tube 14 may be formed with the longitudinally extending seam 34 having any desired orientation. For example, the seam 34 could be formed facing downwardly.

As previously mentioned, it has been found to be advantageous to form the tube 14 from a tape 12 having a transverse cross-sectional area greater than the desired transverse tube cross-sectional area. Using the tube forming techniques described hereinbefore, the extra volume of material provided by the excess cross-sectional area shows up in the tube 14 essentially as longitudinal extension. It has been found that in using the above tube forming techniques, there is no significant change in wall thickness. The wall thickness of the tube 14 is substantially the same as the thickness of the tape 12. The tube forming techniques described herein are, therefore, similar to "tube sinking". The total length of the tube 14 will be greater than the total length of the tape 12 due to the aforenoted longitudinal tube extension. The amount of extension in the tube substantially corresponds to the aforenoted percentage differentials in tape cross-sectional area versus tube cross-sectional area.

The extra volume of material also assists in the formation of a tube 14 having a relatively tight seam 34 characterized by closely abutting edges 36 and 38. In addition, no well or notch is formed at the outer periphery of the seam 34. Further, the edges 36 and 38 forming the seam 34 are deformed by the tube-forming techniques described herein to provide substantially non-linear, intermeshing edges. This results in an increased surface area of the edges to which a sealing material can adhere as compared to the edges of the starting tape 12 thereby improving the resultant strength of the seal. This also assists in providing the optical fiber cable assembly with improved hermeticity.

The deformed, intermeshing edges 36 and 38 are the inherent result of the tube forming technique used herein and do not correspond to the shape of the original tape edges. The deformed edges 36 and 38 result from the drawing or sinking of the tube by the tube-forming techniques described herein.

As previously mentioned, the force or deformation energy needed to pull the tape 12 and the fiber or fibers 18 through the station 24 is preferably provided by the tensioning device 26. In a preferred embodiment, the tensioning device 26 comprises a bull block or capstan positioned between the station 24 and the sealing apparatus 48, most preferably positioned in close proximity to the station 24. The tensioning device 26 may comprise any conventional bull block or capstan known in the art and may be oriented to rotate about any desired axis. Preferably, the tensioning device 26 is oriented to rotate about an axis substantially transverse to the direction of travel of the tape 12 and tube 14. The tensioning device 26 preferably is driven by a drive mechanism 40. The drive mechanism may comprise any suitable motor 42 and drive means 44 e.g. belts, gears or the like, known in the art. If desired, the drive mechanism may be omitted.

The tensioning device 26 utilizes friction as the mechanical coupling between the cable assembly 11 and itself. The amount of pull exerted on the assembly is determined by the number of wraps of the assembly around the tensioning device 26 and the exit tension applied to the assembly 11 leaving the tensioning device 26 by the take-up reel 46. The number of assembly wraps about the tensioning device 26 should be balanced to provide sufficient contact between the tube 14 and the tensioning device 26 while permitting some degree of transverse motion along the tensioning device. If there is too large a number of wraps, the desired transverse motion needed for the invention to operate properly may be prevented.

One of the advantages of this system is that the deformation energy needed to pull the tape 12 through the station 24 to form the tube 14 and to overcome the forming stresses encountered therein is only applied to the metal or metal alloy when it is in a cold condition. In prior art systems, this deformation energy has been applied to the metal or metal alloy when it is in a cold condition and when it is in a derated condition, i.e., after it has been exposed to the elevated temperatures associated with sealing. By applying the deformation energy to the derated metal or metal alloy forming the tube, there is a significant risk of breaking the tube and damaging the fiber or fibers housed therein. The system 10 of the present invention significantly reduces the likelihood of breaking the metallic tube 14 during the fabrication process and damaging the fiber or fibers therein.

After leaving the tensioning device 26, the assembly 11 is passed to a sealing station 48 for sealing the seam 34 in tube 14. While any suitable sealing technique known in the art may be used to seal the seam 34, it is preferred to seal the seam 34 by rapidly passing the tube 14 and its seam 34 through a wave of sealing material.

Referring now to FIG. 4, a sealing station 48 having means for creating a wave of sealing material is illustrated. The sealing station 48 preferably comprises a sump or bath 50 of a sealing material such as solder or a brazing material. To keep the sealing material in a molten state, the sump 50 may be provided with any suitable heating device (not shown) known in the art such as heating coils. The sealing station also has a closed plenum chamber 52 into which the sealing material is pumped to create the sealing material wave. Any suitable pump 54 known in the art may be used to pump the sealing material through the plenum chamber and create the sealing material wave. The plenum chamber 52 is preferably closed to permit the excess sealing material to return to the sump 50 through appropriate overflow passages not shown. Using a closed plenum chamber also permits the sealing operation to take place in a closed or limited environment. It is believed that a better seal can be formed in such an environment.

As shown in FIG. 4, the closed plenum chamber has an opening 58 which acts as a guide for causing the assembly 11 to pass through the meniscus or approximate center of the molten sealing material wave. By passing the assembly 11 through the meniscus or the approximate center of the wave, an improved seal is effected because the cable assembly interacts with clean molten sealing material.

It has also been discovered that there are addition benefits associated with the use of tensioning device 26, particularly in performing the sealing operation. First, the tensioning device 26 assists in properly aligning the cable assembly 11 so that it passes through the meniscus or approximate center of the sealing material wave. Second, it assists in removing slack from the assembly 11 as it passes into the sealing station 48.

The sealing material may comprise any suitable solder or brazing material known in the art. Suitable sealing materials include silver solders, tin solders, high-temperature solders and low-temperature solders such as lead-tin solder, lead-antimony solder and tin-antinomy solder.

It has been discovered that it is desirable to expose the assembly 11 to the molten sealing material for a relatively short period of time i.e., a fraction of a second. By limiting the exposure of the assembly to the molten sealing material, the risk of damaging the tube 14 and the fiber or fibers 18 is significantly reduced. Exposure time can be controlled by using a relatively fast line speed and by limiting the length of the wave in the direction of assembly travel. Preferably, the line speed is in the range of about 20 feet per minute to about 300 feet per minute and the length of the wave is less than about six inches.

Immediately after being sealed, the assembly 11 preferably passes through a wiping device 60 to remove any excess sealing material. The wiping device 60 may comprise any suitable automatic or manual wiping system known in the art. For example, wiping device 60 may comprise a wiping die mounted in the exit wall of the plenum chamber 52. Preferably, the wiping device 60 uses an inorganic fibrous material to remove the excess sealing material.

After being wiped, the cable assembly 11 is preferably cooled down to room temperature. The quenching apparatus 62 may comprise any suitable quenching arrangement known in the art; however, it is preferred to use a system that passes the assembly 11 through a water wall. After quenching, the sealed optical fiber cable assembly 11 may be wound on a spool or take-up reel 46 in a level wind or thread wire manner to assure maximum homogeneity to the assembly. As previously mentioned, the take-up reel 46 also provides the exit tension to the assembly 11 leaving the tensioning device 26. The tension applied by the take-up reel 46 assures effective utilization of the tensioning device 26.

After the assembly has been wound onto the reel 46 and the tension applied to the assembly 11 is released, the tube 14 becomes shorter due to elastic springback. In many systems, this elastic springback would cause a permanent compressional strain in the encapsulated fiber or fibers that increases light attenuation to unacceptable levels. However, by pre-loading the fiber or fibers with a back tension in accordance with the present invention, the risk of elastic springback significantly increasing light attenuation in the fiber or fibers 18 is substantially eliminated.

Figure 6:
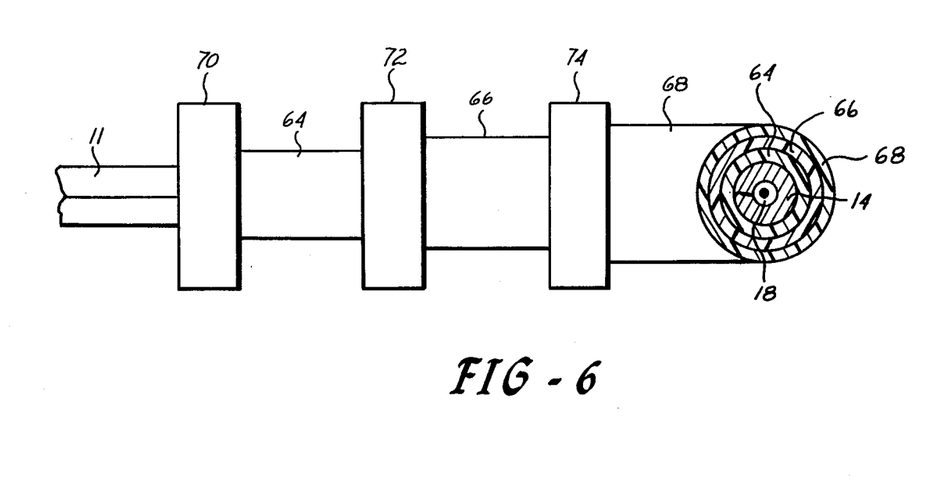
FIG. 6 is a schematic representation of a system for fabricating one or more external layers about the optical fiber cable assembly.

If desired, one or more external layers may be fabricated about the cable assembly either before or after the cable assembly is wound onto the reel 46. For example, a dielectric layer 64, a loadbearing layer 66 and/or a protective jacket 68 may be fabricated about the cable assembly. An apparatus for forming all three layers is illustrated in FIG. 6. The dielectric layer 64 for situations where the tube 14 acts as an electrical conductor may be fabricated in any suitable manner using any suitable apparatus 70 known in the art. For example, the dielectric layer 64 may be extruded about the tube 14 using an extrusion die. Although any suitable dielectric material may be used, it is preferred to fabricate the dielectric layer 64 from a high density polyethylene.

If needed, the cable assembly 11 may be provided with a loadbearing layer 66. The loadbearing layer 66 may be formed from any suitable material such as polyethylene, a polyimide, an epoxy or other similar plastic material. If desired, the loadbearing layer 66 may comprise a contrahelix of plastic filaments in a thermosetting epoxy matrix. The fabrication of this layer may be done in any known manner using any suitable fabrication device 72, e.g., a die arrangement.

The outer jacket 68 may be used in situations where abrasion resistance or additional protection is needed. The outer jacket 68 may be formed from any suitable material such as a protective plastic, rubber, nylon, neoprene, polyethylene, polyurethane or the like. Any suitable apparatus 74 such as an extrusion die may be used to form the outer jacket 68.

The fabrication of the external layer or layers may be done off-line or in-line. The number of external layers to be fabricated depends upon the ultimate use for the optical fiber cable. For example, where the cable is to be deployed in an undersea environment, all three external layers may be used. For above-ground applications, only an outer jacket may be fabricated about the assembly 11.

To demonstrate the effect of back tension on fiber attenuation, the following example was performed.

EXAMPLE

An optical fiber cable having an armor sheath formed from copper alloy C63800 was fabricated using a system similar to that shown in FIG. 1. A single die was used to form the copper alloy C63800 tape into the armor sheath. The armor sheath had an outer diameter of about 0.036" and a wall thickness of about 0.007". A pull force of about 55 pounds was used to pull the tape through the forming die.

During fabrication, 500 micron light fiber was introduced into the cable at the forming die while applying varying amounts of back tension ranging from 0.4 to 1.6 lbs. The light attenuation of the fiber prior to fabrication was 3.7 db/km. After fabrication, the light attenuation was measured for each level of back tension. The results are reported in Table I below.

TABLE I

| Fiber Back Tension (lbs) | Back Tension Strain (in/in) | Light Attenuation (db/km) |
| --- | --- | --- |
| .4 | .0020 | 43.0 |
| .6 | .0031 | 9.2 |
| .8 | .0041 | 9.2 |
| 1.0 | .0051 | 5.3 |
| 1.2 | .0061 | 5.0 |
| 1.4 | .0072 | 4.8 |
| 1.6 | .0082 | 3.7 |

As can be seen from Table I, the light attenuation decreased from 43 db/km to 3.7 db/km with increasing back tension from 0.4 lbs to 1.6 lbs. At an applied back tension of 1.6 lbs, the final light attenuation was the same as the starting light attenuation or no light loss was caused by processing.

The optical fiber cable produced by the instant invention can be used in underground, aboveground and undersea communication applications. For example, it could be used to supply data support and power to a deep sea sensor. It could also be used for underground, aboveground and undersea telephone applications.

While it is preferred to fabricate the optical fiber cable assembly using an intermediate tensioning device for applying the pull force to the tape, the intermediate tensioning device may be omitted. In such a system, the take-up reel applies the pull force needed for tube formation.

While it is preferred to use an accumulator to apply the back tension force to the fiber, other means known in the art such as a dancer or a suspended weight could be used to apply the back tension force.

If desired, an insertion needle not shown may be used to protect the fiber or fibers during armor tube formation. Suitable insertion needle contructions are shown in U.S. patent application Ser. No. 413,846, filed Sept. 1, 1982, now U.S. Pat. No. 4,508,423, which is hereby incorporated by reference. The use of an insertion needle is also recommended if a filler material such as a gel is to be inserted in the armor tube. Any suitable filler material known in the art may be used in the cable assemblies of the present invention.

While the tube forming apparatus of FIG. 3 illustrates the use of a die 30 for forming an open tube section, if desired, forming rolls could be employed to form the open tube section. The final forming of the tube section into the tube, however, should be by die forming as described herein.

While the tape 12 preferably comprises a flat continuous tape, a preformed tape, e.g., a tape having a preformed U-shaped cross-sectional configuration could also be used.

The U.S. patents and patent applications, and the patent publications set forth in this application are intended to be incorporated by reference herein.

It is apparent that there has been provided in accordance with this invention a novel optical fiber cable fabrication technique which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed:

1. A process for fabricating an optical fiber cable assembly, said process comprising:
applying a pull force to a metal or metal alloy tape and pulling said tape through means for forming said tape into a hollow armor tube having a desired outer diameter and a desired inner diameter; and
inserting at least one optical fiber into said forming tube, said inserting step including applying a back tension force to said at least one optical fiber, said back tension force having a magnitude substantially equal to that defined by the following equation:

$$P_F = E_F \left[ \frac{P_T}{\frac{\pi}{4} (D_{OD}^2 - D_{ID}^2) E_A} \right] \left( \frac{\pi D_F^2}{4} \right)$$

where
$P_F$ = a desired back tension force magnitude;
$E_F$ = elastic modulus of said at least one optical fiber;
$P_T$ = said pull force;
$D_{OD}$ = said desired outer tube diameter;
$D_{ID}$ = said desired inner tube diameter;
$E_A$ = elastic modulus of said metal or metal alloy; and
$D_F$ = outer diameter of each said optical fiber.

2. The process of claim 1 wherein said back tension force applying step comprises:

applying a back tension force having a magnitude within about 20% of the force magnitude $P_F$ defined by said equation.

3. The process of claim 1 wherein said back tension applying step comprises:
applying a back tension force having a magnitude within about 5% of the force magnitude $P_F$ defined by said equation.

4. The process of claim 1 wherein said fiber inserting step comprises:
inserting a plurality of optical fibers into said forming tube; and
applying a back tension force to each of said optical fibers.

5. The process of claim 4 wherein said back tension applying step further comprises:
applying different back tensions to different ones of said optical fibers.

6. The process of claim 1 wherein said pulling step comprises:
pulling said tape through at least one forming die to form said hollow tube, said tube having a longitudinally extending seam.

7. The process of claim 6 wherein said pull force applying step comprises:
wrapping said tube and said at least one optical fiber encapsulated therein about at least one rotatable tensioning device.

8. The process of claim 6 wherein said back tension force applying step comprises:
providing an accumulator having at least two rotatable sheaves;
wrapping said at least one optical fiber about said sheaves; and
applying a load to one of said sheaves,
whereby said back tension force creates a back strain in said at least one optical fiber that substantially compensates for any compressional strain in said at least one optical fiber caused by tube springback upon relaxation of said pull force and thereby substantially reducing the risk of increasing light attenuation in said at least one optical fiber during fabrication.

9. The process of claim 6 wherein said pulling step comprises:
pulling said tape through a first die to form an open tube section, said at least one optical fiber being positioned within said open tube section; and
pulling said open tube section through a second die to close said open tube section about said at least one optical fiber and to place said seam in a state of compression.

10. The process of claim 6 further comprising:
substantially filling said seam with a sealing material.

11. The process of claim 10 further comprising:
fabricating at least one external layer about said tube.

12. An apparatus for fabricating an optical fiber cable assembly, said apparatus comprising:
means for forming a metal or metal alloy tape into a hollow armor tube having a desired outer diameter and a desired inner diameter;
means for applying a pull force to said tape for pulling said tape through said tube forming means; and
means for inserting at least one optical fiber into said forming tube, said inserting means including means for applying a back tension force to said at least one optical fiber, said back tension having a magnitude substantially equal to that defined by the following equation:

$$P_F = E_F \left[ \frac{P_T}{\frac{\pi}{4}(D_{OD}^2 - D_{ID}^2) E_A} \right] \left( \frac{\pi}{4} D_F^2 \right)$$

where
$P_F$ = a desired back tension force magnitude;
$E_F$ = elastic modulus of said at least one optical fiber;
$P_T$ = said pull force;
$D_{OD}$ = said desired outer tube diameter;
$D_{ID}$ = said desired inner tube diameter;
$E_A$ = elastic modulus of said metal or metal alloy; and
$D_F$ = diameter of said at least one optical fiber.

13. The apparatus of claim 12 wherein said fiber inserting means comprises:
means for inserting a plurality of optical fibers into said tube; and
means for applying a back tension force to each of said fibers.

14. The apparatus of claim 13 wherein said fiber inserting means further comprises:
means for applying different back tensions to different ones of said fibers.

15. The apparatus of claim 12 wherein said tube forming means comprises at least one die for forming said tape into a substantially closed tube closely surrounding said at least one optical fiber, said tube having a longitudinally extending seam.

16. The apparatus of claim 15 wherein said pull force applying means comprises at least one rotatable tensioning device about which said tube containing said at least one optical fiber is wrapped.

17. The apparatus of claim 15 wherein said back tension force applying means comprises:
an accumulator having at least two rotatable sheaves, said at least one optical fiber being wrapped about said sheaves; and
means for applying a load to at least one of said sheaves,
whereby said back tension force creates a back strain in said at least one optical fiber that substantially compensates for any compressional strain in said at least one optical fiber caused by tube springback upon relaxation of said pull force and thereby substantially reducing the risk of increasing light attenuation in said at least one optical fiber during fabrication.

18. The apparatus of claim 15 wherein said tube forming means comprises:
a first die for forming said tape into an open tube section, said at least one optical fiber being positioned within said open tube section; and
a second die for closing said tube section about said at least one optical fiber and for placing said seam in a state of compression.

19. The apparatus of claim 15 further comprising:
means for sealing said seam.

20. The apparatus of claim 15 further comprising:
means for fabricating at least one external layer about said tube.

21. The optical fiber cable assembly formed by the process of claim 1.

* * * * *